July 8, 1958  R. H. SCHUMANN  2,842,009
OPERATING LEVER FOR FARM TRACTOR TORQUE AMPLIFIER
Filed July 18, 1955
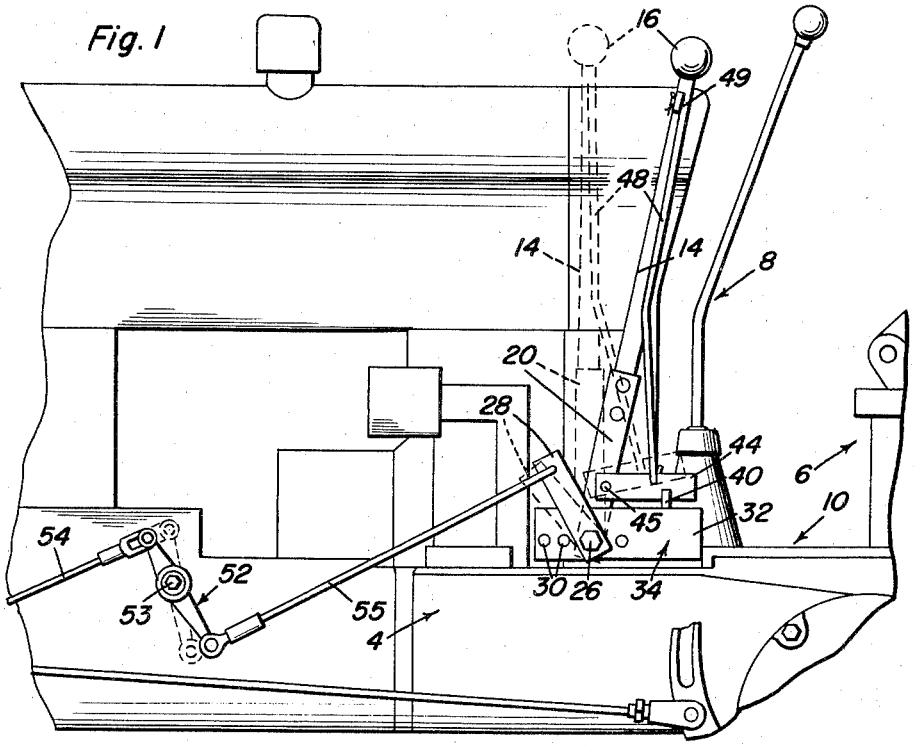
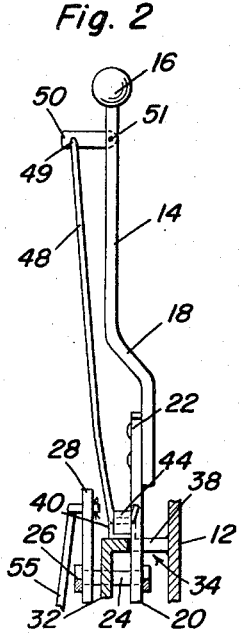
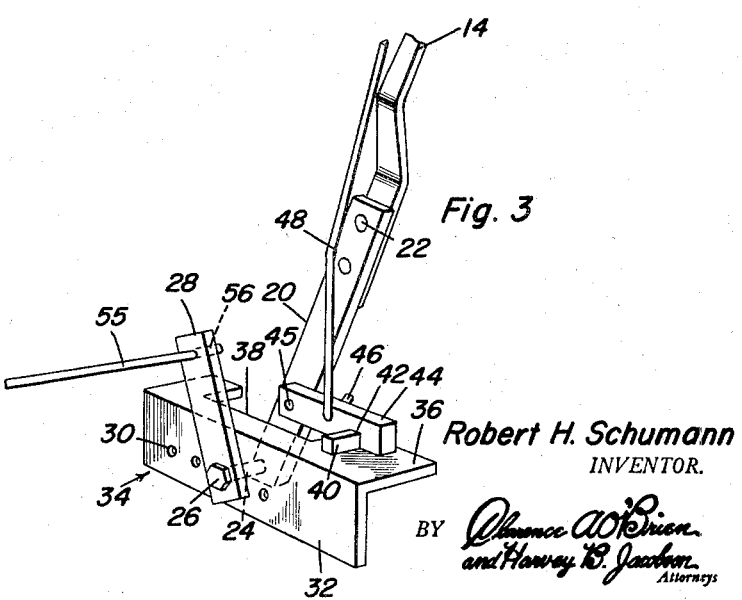
Robert H. Schumann
INVENTOR.

United States Patent Office 2,842,009
Patented July 8, 1958

2,842,009

OPERATING LEVER FOR FARM TRACTOR TORQUE AMPLIFIER

Robert H. Schumann, Ida Grove, Iowa

Application July 18, 1955, Serial No. 522,549

1 Claim. (Cl. 74—491)

The present invention has to do with simple and practical means which has been expressly and properly designed to cope with a problem which has presented itself in connection with the currently installed manually actuable operating lever on a farm tractor equipped with a so-called torque amplifier.

With a view toward focusing attention on the precise nature of the accomplishment which is herein under advisement, it is to be pointed out that certain farm tractors, such as the Farmall-type, come equipped with a torque amplifier and a lever through the medium of which said torque amplifier is rendered optionally operable. As the reader may appreciate at the outset, the lever in question resembles to some extent a hand brake used on present day automobiles. To this end, the improved lever and associated mounting means is designed and therefore properly intended to take the place of the lever now provided and which, instead of being situated or located in an unhandy place, is moved to a more satisfactory position which, while adjacent the gear shift lever, is nevertheless fully out of the entrance and exit space in proximity to the driver's seat. Stated otherwise, the controller lever for the torque amplifier on the International Harvester "Farmall 300" tractor is inconveniently located. With this objectionable structural characteristic in mind, the subject matter of the instant invention involves a similarly constructed lever and special means whereby the same may be shifted to a so-called out-of-the-way position where it is even more handy to comply with the requirements of the driver and to fulfill the requirements of and objectives under consideration here.

In carrying out the principles of the invention, the orginal installation is dispensed with insofar as the lever and its mounting is concerned. An adapter bracket is substituted, and this serves as a mount for the lever and associated components, whereby to provide a highly desirable and economical novel development in the field of endeavor under consideration.

Other objects, features and advantages will become more readily apparent from the following description and the accompanying sheet of drawings.

In the drawings, wherein like numerals are employed to designate like parts throughout the same:

Figure 1 is a fragmentary elevational view of the aforementioned International Harvester Farmall 300 tractor with the improved handy lever means thereon;

Figure 2 is a more detailed view showing the essential features of the invention; and Figure 3 is a fragmentary perspective view in which the features are effectually revealed.

Referring now to the drawings with the aid of reference numerals and accompanying lead lines, the tractor, generally visualized, is denoted by the numeral 4, the driver's seat being denoted at 6 and the gear shift lever at 8 and the entrance and exit opening at 10. The invention itself is associated directly with the part 12 (Figure 2) of the tractor chassis in a generally clear manner.

First of all, there is the controller and shifting lever 14. This has the customary ball-head 16 on its upper end. The lower end portion is laterally offset at 18 where an extension 20 is riveted or otherwise affixed thereto, as at 22. This extension is in effect a rocker arm and is fixed on one end of a simple bolt 24 which is here treated as a rocker shaft. The other headed end 26 of the same shaft has a shorter arm 28 fixed thereto. These are sometimes referred to as rocker arms and in other instances as crank members. In any event, the rock shaft itself is selectively journaled in any one of the bearing holes 30 provided in the depending vertical flange 32 of the adapter bracket 34. This is a simple angle iron of appropriate length, and the horizontal or top flange is denoted at 36. It has a notch cut out, as at 38, which serves as a clearance for operation of the rocker arm 20. At one end of the notch and on the top of the flange, there is a block-like member 40 which is suitably fixed and constitutes a keeper. This serves to accommodate a keeper notch 42 provided in the lower edge of the latch 44. The latch is pivotally mounted at one end, as at 45, on the rocker arm 20. The latch is shown engaged with the keeper in full lines in the drawings. The lower end portion 46 of a trip wire 48 is connected with the intermediate portion of the latch. The upper laterally directed end 49 of this trip wire is pivotally connected to the intermediate portion of a releasing finger 50. The latter is pivotally mounted at one end, as at 51, on the lever just below the ball-head 16. The angle iron serving as the adapter bracket is, of course, an essential part of the overall combination. This makes it possible to weld or otherwise secure the edge of the notched horizontal flange 36 to the part 12 in the manner brought out in Figure 2. As already pointed out, the invention is a lever assembly and arrangement designed to take the place of the lever with which the tractor comes equipped, and instead of being located as the original lever, is located at a point which is not in the way of the person getting on or off of the tractor. The usual torque converter means denoted generally at 52 in Fig. 1 is mounted, as at 53, and the customary link 54 is connected therewith on one side. There is another rod or link 55 on the other side, and this is hingedly connected, as at 56, with the upper end of the rocker arm 28, as perhaps best shown in Figure 3.

The released position of the controller lever 14 is shown in phantom lines in Figure 1. The operating and controlling position is, of course, shown in full lines. When the latch is engaged, as shown for example in Figure 3, the torque amplifier means is in gear. When the latch is released, as shown in phantom lines in Figure 1, the torque amplifier is not in gear. The latch is controlled by the lifting and lowering of the finger trip 50 and its connecting rod 48. Simply stated, the torque amplifier may be taken out of gear by lifting up on the finger 50 or brought into gear by engaging the latch 44 with the keeper 40.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

For use in conjunction with a torque amplifying means employed, for example, on the International Harvester "Farmall 300" Tractor, an adapter bracket designed to be fastened and anchored at a given place of vantage on said tractor, said bracket comprising an angle iron having horizontal and vertical flanges, a lengthwise edge portion of said horizontal flange being adapted to be fixed on a stationary part of the tractor frame and being provided intermediate its ends with a clearance notch opening through said edge portion, a rocker shaft parallel to and situated beneath said horizontal flange and mounted for angular rotation in a bearing hole provided therefor in the vertical flange, said bearing hole situated at the median portion of said notch, a rocker arm fixed at its lower end to one end portion of said rocker shaft and operable back and forth in said clearance notch and extending above the plane of said horizontal flange, a lever in alignment with said rocker arm and having its lower end overlapped and fixed to the upper end portion of said rocker arm, a second rocker arm shorter than the first rocker arm secured to the opposite end of said rocker shaft and paralleling and located on one side of the vertical flange of said bracket, said second named rocker arm being adapted to accommodate a push-pull link which is operatively connectible, with complemental torque amplifying means, a keeper fixed transversely atop said horizontal flange at one end portion of said clearance notch, a latch pivotally mounted on said first named rocker arm and having a free end portion provided with a keeper notch releasably engageable with said keeper, a trip finger pivotally mounted on the upper end portion of said lever, and an operating member affording an operating connection between the trip finger and an intermediate portion of said latch.

References Cited in the file of this patent

UNITED STATES PATENTS

| | | |
|---|---|---|
| 141,868 | Elward | Aug. 19, 1873 |
| 570,674 | Muller | Nov. 3, 1896 |
| 667,341 | Sague | Feb. 5, 1901 |
| 1,304,955 | Fowler | May 27, 1919 |
| 1,328,899 | Ritter et al. | Jan. 27, 1920 |
| 1,706,331 | Steele | Mar. 19, 1929 |
| 2,510,425 | Sieverding | June 6, 1950 |
| 2,621,536 | Haverkamp | Dec. 16, 1952 |